US008783640B2

(12) United States Patent
Goodbred, III

(10) Patent No.: US 8,783,640 B2
(45) Date of Patent: Jul. 22, 2014

(54) ROTATABLE DRIVE CONNECTION THAT REDUCES CHATTER

(75) Inventor: Neil Gentry Goodbred, III, Northville, MI (US)

(73) Assignee: Lear Corporation, Southfield, MI (US)

(*) Notice: Subject to any disclaimer, the term of this patent is extended or adjusted under 35 U.S.C. 154(b) by 188 days.

(21) Appl. No.: 13/077,307

(22) Filed: Mar. 31, 2011

(65) Prior Publication Data
US 2012/0248278 A1    Oct. 4, 2012

(51) Int. Cl.
*B25G 3/00*    (2006.01)
(52) U.S. Cl.
USPC ............... 248/429; 464/60; 464/53; 403/383; 74/502.6; 297/344.15
(58) Field of Classification Search
USPC ................... 248/429; 464/52, 53, 383, 60; 297/344.15, 344.17
See application file for complete search history.

(56) References Cited

U.S. PATENT DOCUMENTS

| | | | |
|---|---|---|---|
| 543,854 A | 8/1895 | Davis | |
| 1,491,186 A * | 4/1924 | Bartlett | 464/115 |
| 1,871,528 A * | 8/1932 | Joline | 464/53 |
| 2,100,232 A * | 11/1937 | Barry | 464/101 |
| 3,240,233 A * | 3/1966 | Johnston | 138/108 |
| 3,434,369 A | 3/1969 | Runkle | |
| 4,575,356 A * | 3/1986 | Murohushi et al. | 464/52 |
| 4,827,941 A * | 5/1989 | Taylor et al. | 600/434 |
| 5,558,578 A * | 9/1996 | Uryu et al. | 464/52 |
| 5,823,499 A | 10/1998 | Ito et al. | |
| 6,167,725 B1 * | 1/2001 | Siekierski | 63/12 |
| 6,464,588 B1 | 10/2002 | Rupp | |
| 6,533,235 B1 | 3/2003 | Dymerski et al. | |
| 7,022,018 B2 * | 4/2006 | Koga | 464/52 |
| 7,527,334 B2 * | 5/2009 | Kiehler et al. | 297/216.13 |
| 7,699,397 B2 * | 4/2010 | Andou et al. | 297/354.12 |
| 2005/0047856 A1 | 3/2005 | Allswede | |

FOREIGN PATENT DOCUMENTS

DE    1780446 A1    2/1972
JP    H0986236 A    3/1997

OTHER PUBLICATIONS

German Search Report, Application No. DE102012204780.8 dated Jun. 4, 2013.

* cited by examiner

*Primary Examiner* — Terrell McKinnon
*Assistant Examiner* — Daniel Breslin
(74) *Attorney, Agent, or Firm* — MacMillan, Sobanski & Todd, LLC

(57) ABSTRACT

A rotatable drive connection is provided for transmitting torque. The connection includes a first component having an aperture with a plurality of corners. The connection further includes a second component having an end portion with a plurality of edges. The end portion of the second component is smaller than the aperture of the first component. The end portion of the second component is disposed within the aperture of the first component such that at least one of the edges of the end portion is always biased into engagement with at least one of the corners of the aperture throughout a full rotation of the first and second components.

16 Claims, 4 Drawing Sheets

US 8,783,640 B2

ROTATABLE DRIVE CONNECTION THAT REDUCES CHATTER

BACKGROUND OF THE INVENTION

This invention relates in general to rotatable drive connections, such as are commonly used with flexible driveshafts for transmitting rotational power from a driving component to a driven component. In particular, this invention relates to an improved structure for such a rotatable drive connection that reduces chatter and that is cost effective to manufacture and assemble.

Flexible driveshafts are used in a wide variety of applications including vehicles, surgical apparatuses, robotics, machine tools, and the like. For example, flexible driveshafts are commonly used in power vehicle seat assemblies for transmitting rotational power from a bi-directional motor to a gear box. The gear box typically includes a lead screw having a drive nut threaded thereon for converting rotational movement of the lead screw into linear movement of the drive nut. The drive nut is attached to the seat assembly for effecting linear movement thereof whenever the motor is operated. In such an application, a flexible driveshaft can be routed along a non-linear path or can be maneuvered over, under, or around obstacles between the motor and the gear box. Thus, the flexible driveshaft provides for numerous possibilities in positioning a driving component and driven component relative to one another.

Flexible driveshafts of this general type are typically provided with end portions having non-circular cross sectional shapes. These non-circular end portions can be inserted into corresponding hollow sockets provided on the driving and driven components to provide rotatable driven, axially movable connections. It is known to provide both the end portion of the flexible driveshaft and its corresponding hollow socket with square cross sectional shapes for these purposes.

However, because the hollow socket is typically larger in size than the end portion of the flexible driveshaft (either by design or as a result of manufacturing tolerances), there can be looseness therebetween. Such looseness may generate undesirable noise and vibration as the flexible driveshaft is rotated, which is commonly referred to as chatter. A number of structures have been developed for reducing such chatter. For example, a coating or clip can be applied onto the end portion of the flexible driveshaft for taking up some of the looseness. It is also known to provide a twist or helix along the end portion that is disposed within the hollow socket. However, these and other known structures can undesirably increase manufacturing and assembly costs. Thus, it would be desirable to provide an improved rotatable drive connection that both reduces chatter and is simple and inexpensive to manufacture and assemble.

SUMMARY OF THE INVENTION

This invention relates to a rotatable drive connection for transmitting torque. The connection includes a first component having an aperture with a plurality of corners. The connection further includes a second component having an end portion with a plurality of edges. The end portion of the second component is smaller than the aperture of the first component. The end portion of the second component is disposed within the aperture of the first component such that at least one of the edges of the end portion is always biased into engagement with at least one of the corners of the aperture throughout a full rotation of the first and second components.

Various aspects of this invention will become apparent to those skilled in the art from the following detailed description of the preferred embodiments, when read in light of the accompanying drawings.

DETAILED DESCRIPTION OF THE ILLUSTRATED EMBODIMENTS

Figure 1:
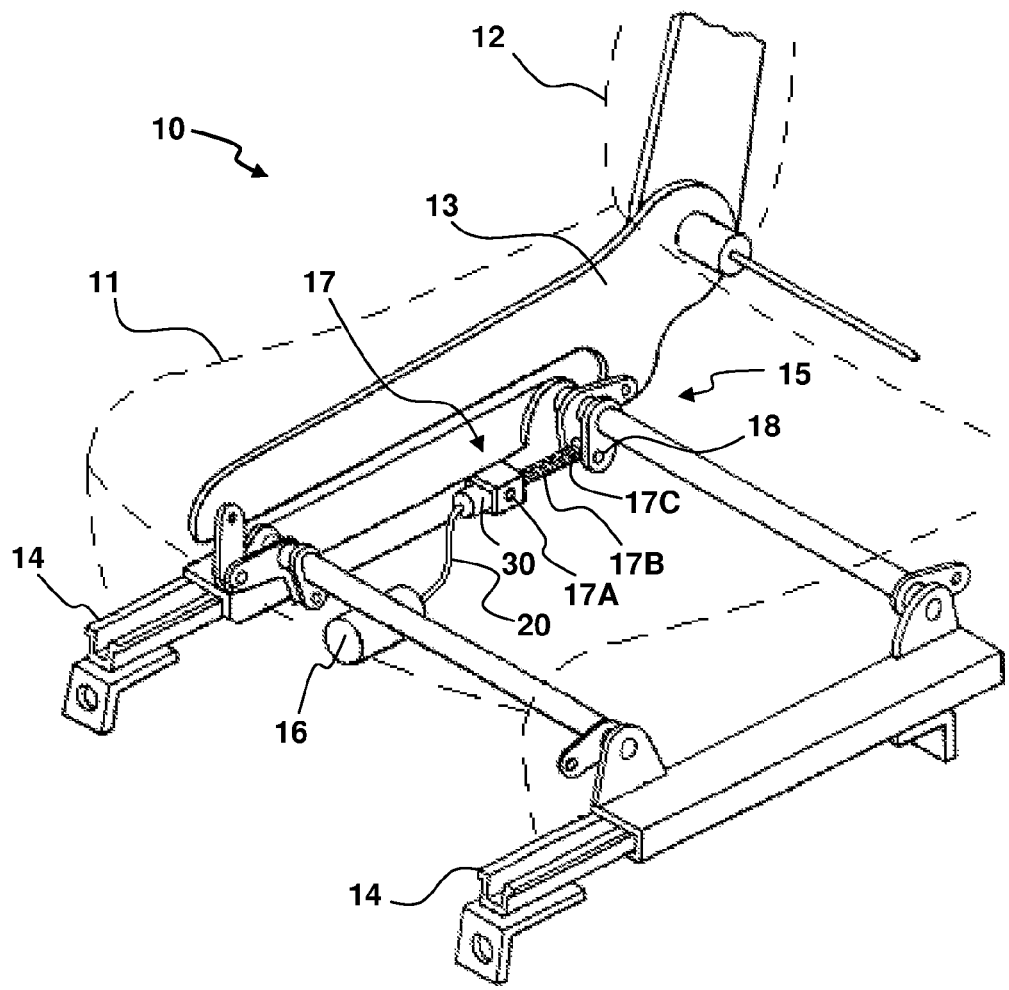
FIG. 1 is a perspective view of a portion of a portion of a seat assembly that includes a rotatable drive connection in accordance with this invention.

Referring now to the drawings, there is illustrated in FIG. 1 a portion of a seat assembly, indicated generally at 10, such as for use in a passenger compartment of an automobile. Although this invention will be described and illustrated in the context of the illustrated automotive seat assembly 10, it will be appreciated that this invention can be used in any desired environment and for any desired purpose. The illustrated seat assembly 10 includes a seat bottom 11 and a seat back 12. The seat back 12 can be supported with respect to the seat bottom 11 by a seat frame 13. In the illustrated embodiment, the seat assembly 10 includes a conventional fore/aft movement mechanism, although such is not required. The illustrated fore/aft movement mechanism includes a pair of conventional laterally spaced rail assemblies 14. Each of the spaced rail assemblies 14 includes an upper rail that is secured to the seat bottom 11 and a lower rail that is secured to a support structure, such as a floor panel (not shown). Relative movement between the upper and lower rails (and, therefore, between the seat assembly 10 and the floor panel) can be accomplished manually or by a power assist mechanism (not shown), both of which are conventional in the art.

The illustrated seat assembly 10 also includes a mechanism, indicated generally at 15, for adjusting the vertical distance between the floor pan and the seat assembly 10. The illustrated vertical distance adjustment mechanism 15 is, in large measure, conventional in the art and is intended merely to illustrate one environment in which this invention may be used. Thus, the scope of this invention is not intended to be limited for use with the specific structure for the vertical distance adjustment mechanism 15 illustrated in FIG. 1 or with seat position adjustment devices in general. On the contrary, as will become apparent below, this invention may be used in any desired environment for the purposes described below.

The illustrated vertical distance adjustment mechanism 15 includes a driving 16 and a driven component 17. The illustrated driving component 16 can be embodied as any source of rotational power. In the illustrated embodiment, the driving component 16 is a bi-directional electric motor. The driven component 17 can be embodied as any device that is responsive to the application of rotational power for actuation. In the illustrated embodiment, the driven component 17 includes a gear box 17A, a lead screw 17B extending from the gear box 17A, and a drive nut 17C that is threaded onto the lead screw 17B. The illustrated drive nut 17C is connected to a lever arm 18 that, in turn, is connected to the seat frame 13 of the seat assembly 10. In a manner that is well known in the art, rotation of the lead screw 17B causes linear movement of the drive nut 17B which, in turn, causes pivoting movement of the lever arm 18. Depending upon which direction the lead screw 17B is rotated, such pivoting movement of the lever arm 18 will either raise or lower the seat assembly 10 relative to the floor pan.

A flexible driveshaft assembly, indicated generally at 20, is provided to connect the driving component 16 to the driven component 17. The flexible driveshaft assembly 20 is connected at a first end to an output member (not shown) of the driving component 16 and at a second end to an input member 30 of the driven component 17. Thus, as will be described below, when the driving component 16 rotates the output member, the flexible driveshaft assembly 20 rotatably drives the input member of the driven component 17. Advantageously, the flexible driveshaft assembly 20 can be routed along a non-linear path or can be maneuvered over, under, or around obstacles (not shown). The flexible driveshaft assembly 20 may, however, be embodied as any member that is configured to transmit torque from the driving component 16 to the driven component 17 and need not be flexible in nature.

Figure 2:
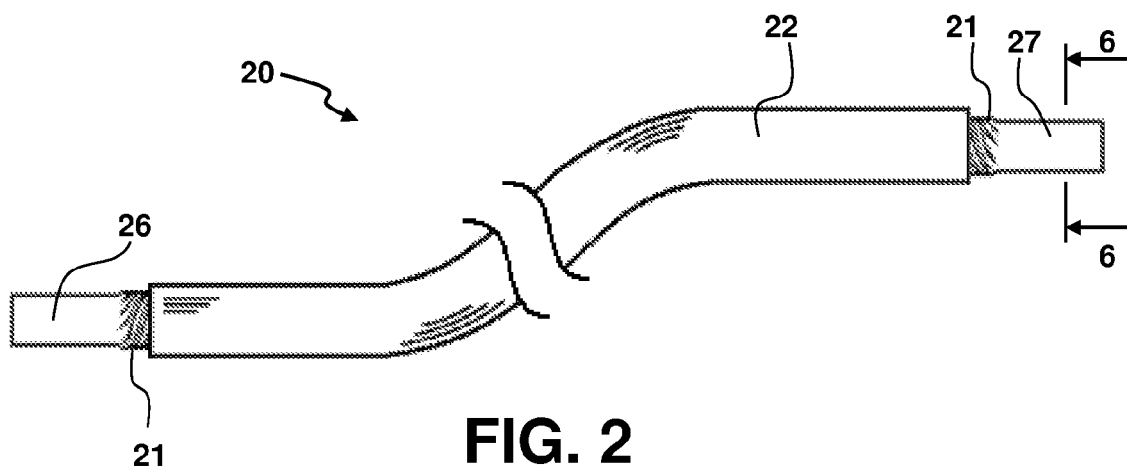
FIG. 2 is a side elevational view of a portion of a flexible driveshaft assembly illustrated in FIG. 1.

Referring now to FIG. 2, the illustrated flexible driveshaft assembly 20 includes a flexible driveshaft 21 that, in large measure, is conventional in the art. The flexible driveshaft 21 can, for example, be formed from a plurality of strands of metal wire that are wound about a flexible core in an alternating fashion. However, the flexible driveshaft 21 may be formed having any desired structure that is adapted to transmit torque from the driving component 16 to the driven component 17. The flexible driveshaft 21 may, if desired, be supported for rotation within an outer protective sleeve 22, although such is not required.

The flexible driveshaft 21 includes a first end portion 26 and a second end portion 27. The first and second end portions 26 and 27 may, as illustrated, be formed integrally with the flexible driveshaft 21. This can be accomplished by any desired process that is adapted to shape the ends of the flexible driveshaft 21 to a desired cross sectional shape, such as will be described below. For example, the first and second end portions 26 and 27 can be shaped using a cold forming process commonly known as a rotary swaging process. Alternatively, the flexible driveshaft 21 may be provided with separate first and second end fittings (not shown) that are secured to the respective ends of the flexible driveshaft 21. In the illustrated embodiment, the first and second end portions 26 and 27 are solid male members. However, as will become apparent below, the first and second end portions 26 and 27 can be formed as hollow female members.

Figure 3:
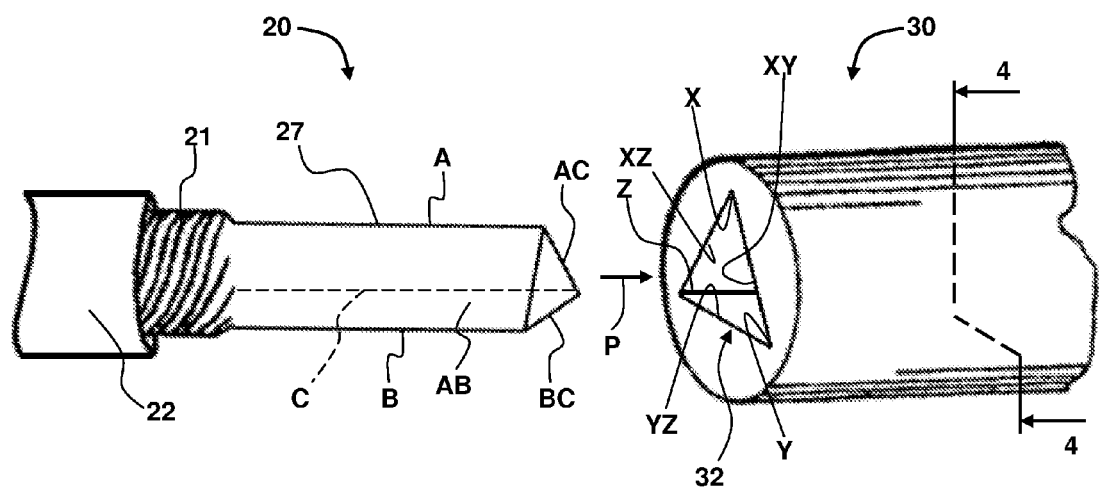
FIG. 3 is a perspective view of a first embodiment of a rotatable drive connection in accordance with this invention shown prior to assembly.
Figure 4:
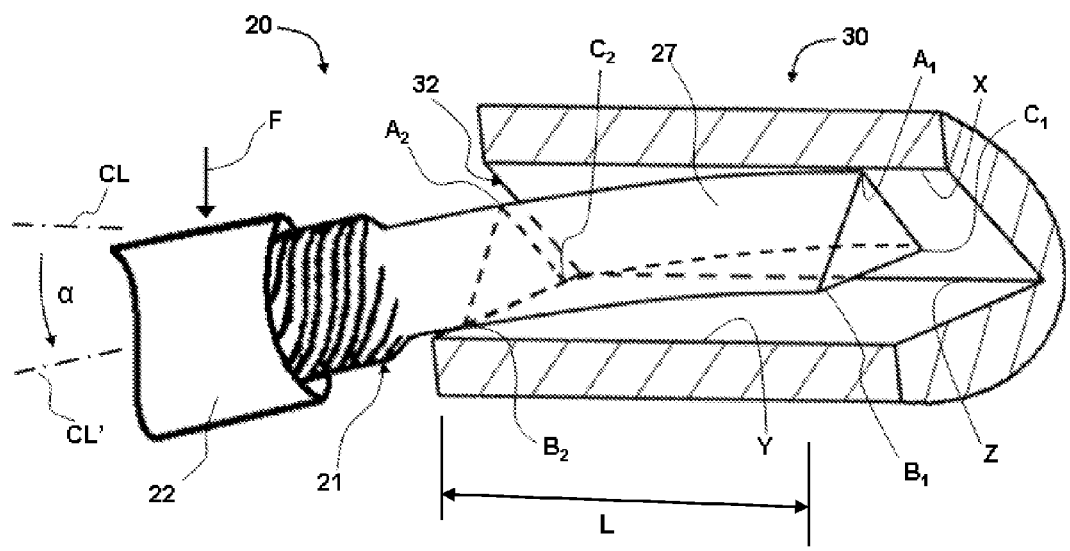
FIG. 4 is a cross sectional view of the first embodiment of the rotatable drive connection illustrated in FIG. 3 shown assembled.

FIGS. 3 and 4 illustrate a rotatable drive connection in accordance with this invention that includes both the end portion 27 of the flexible driveshaft assembly 20 and the input member 30 of the driven component 17. In the illustrated embodiment, the input member 30 of the driven component 17 is a hollow female member. The illustrated input member 30 includes an aperture 32 that, as shown in FIG. 4, is adapted to receive the end portion 27 of the flexible driveshaft assembly 20 therein. However, as suggested above, the input member 30 of the driven component 17 can be formed as a solid male member that is adapted to be inserted within a hollow female second end portion 27 of the flexible driveshaft assembly 20.

As shown in FIGS. 3 and 4, the second end portion 27 of the flexible driveshaft assembly 20 and the aperture 32 of the input member 30 are formed having complementary, non-circular cross sectional shapes. The second end portion 27 of the flexible driveshaft assembly 20 is slightly smaller in size than the aperture 32 of the input member 30. As a result, the second end portion 27 of the flexible driveshaft assembly 20 can be easily inserted within the aperture 32 of the input member 30 so as to form a rotatable, loose fitting connection therebetween. Although not illustrated, it will be appreciated that the opposite end portion 26 of the flexible driveshaft 21 can be rotatably connected to the output member of the driven component 16 in a similar fashion.

In the illustrated embodiment, the end portion 27 of the flexible driveshaft assembly 20 has a cross sectional shape that is triangular, being defined by a first surface AB, a second surface BC, and a third surface AC. Each of these surfaces AB, BC, and AC extends axially along the end portion 27 of the flexible driveshaft assembly 20. Such surfaces AB, BC, and AC extend from one another so as to define a plurality of axially extending edges A (defined between the surfaces AB and AC), B (defined between the surfaces AB and BC), and C (defined between the surfaces BC and AC). In the illustrated embodiment, the surfaces AB, BC, and AC are planar and the edges A, B, and C are linear. As a result, the end portion 27 of the flexible driveshaft assembly 20 has a linear shape, without any curvature or helix when unstressed as shown in FIG. 3. The cross sectional shape of the illustrated end portion 27 defines an equilateral triangle, although such is not required. Additionally, the illustrated edges A, B, and C extend parallel to one another along the axial length of the end portion 27 and, therefore, define a continuous cross sectional shape that is uniform throughout. However, the cross sectional shape of the end portion 27 may, if desired, vary along some or all of the axial length thereof.

As shown in FIG. 4, the edges A, B, and C of the end portion 27 extend from respective first edge portions $A_1$, $B_1$, and $C_1$ to respective second edge portions $A_2$, $B_2$, and $C_2$. The first edge portions $A_1$, $B_1$, and $C_1$ are located at the outermost tip of the end portion 27 of the flexible driveshaft assembly 20, while the second edge portions $A_2$, $B_2$, and $C_2$ are located inwardly of such tip adjacent to the flexible driveshaft 21 of the flexible driveshaft assembly 20. The purposes for these first edge portions $A_1$, $B_1$, and $C_1$ and second edge portions $A_2$, $B_2$, and $C_2$ will be explained below.

As mentioned above, the aperture 32 of the input member 30 has a cross sectional shape that is complementary to the cross sectional shape of the end portion 27 of the flexible driveshaft assembly 20. Thus, in the illustrated embodiment, the aperture 32 of the input member 30 has a cross sectional shape that is triangular, being defined by a first surface XY, a second surface YZ, and a third surface XZ. Each of these surfaces XY, YZ, and XZ extends axially along the aperture 32 of the input member 30. Such surfaces XY, YZ, and XZ extend from one another so as to define a plurality of axially extending corners X (defined between the surfaces XY and XZ), Y (defined between the surfaces XY and YZ), and Z (defined between the surfaces XZ and YZ). In the illustrated embodiment, the corners XY, YZ, and XZ are planar and the edges X, Y, and Z are linear. As a result, the aperture 32 of the input member 30 has a linear shape, as shown in FIG. 3. The cross sectional shape of the illustrated aperture 32 defines an equilateral triangle, although such is not required. Additionally, the illustrated corners X, Y, and Z extend parallel to one another along the axial length of the aperture 32 and, therefore, define a continuous cross sectional shape that is uniform throughout. However, the cross sectional shape of the aperture 32 may, if desired, vary along some or all of the axial length thereof.

FIG. 4 shows the end portion 27 of the flexible driveshaft assembly 20 after having been inserted within the aperture 32 of the input member 30. The aperture 32 defines a first axis of rotation, which is indicated in FIG. 4 by a dashed line CL. The length of the end portion 27 of the flexible driveshaft 21 that is inserted within the aperture 32 is defined by an engagement length L. Although it has been found that chatter can be reduced somewhat by increasing the engagement length L, this typically increases the costs associated with manufacturing and assembling the power seat adjuster 14. An engagement length L in the range of approximately 10 mm-12 mm has been found to be desirable for a typical application. It should be appreciated, however, that the engagement length L can be amount that is suitable for a desired application.

Chatter may become more pronounced when the flexible driveshaft assembly 20 is routed along a non-linear path from the driving component 16 to the driven component 17 (a situation that is common in automobile seat applications such as illustrated in FIG. 1). The non-linear path of the flexible driveshaft assembly 20 can generate a side load that has a component force (indicated at F in FIG. 4) that acts on the flexible driveshaft 21 and can cause the flexible driveshaft 21 to rotate about a second axis of rotation (indicated in FIG. 4 by a dashed line CL') that is different from the first axis of rotation CL defined by the aperture 32 of the input member 30. Because of the loose fitting connection between the end portion 27 and the aperture 32, the end portion 27 is biased into engagement with a leading edge of the aperture 32 along a bottom section thereof, respectively. The force F pivots the end portion 27 about the leading edge such that a tip of the end portion 27 is biased into engagement with the aperture 32 along a top section thereof that is spaced from the leading edge, respectively. Thus, the end portion 27 may become deflected or otherwise bowed along the engagement length L as indicated by deflection angle α, although such is not required.

Figure 5A:
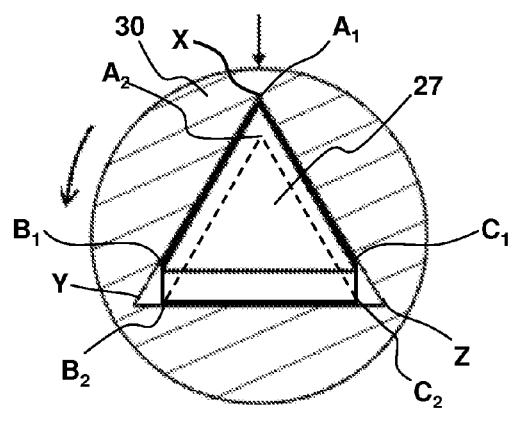
FIG. 5A is an end view of the first embodiment of the rotatable drive connection illustrated in FIG. 4 shown at a first rotational position.

Referring now to FIGS. 5A through 5D, the operation of the rotatable drive connection will be described as the mating flexible driveshaft 20 and input member 30 are rotatably driven by the driving component 16. As shown in FIG. 5A, the end portion 27 of the flexible driveshaft member 20 and the input member 30 are shown in an initial position. In this initial position, the surface BC is biased into contact with the surface YZ at the leading edge thereof. Accordingly, the first edge portion $A_1$ is biased into engagement with the corner X at the tip. More specifically, the surface AB and the surface AC are biased into contact with the surface XY and the surface XZ at the tip, respectively. Engagement of the first edge portion $A_1$ with the corner X can function to reduce lateral movement and torsional deflection of the end portion 27 within the aperture 32.

Figure 5B:
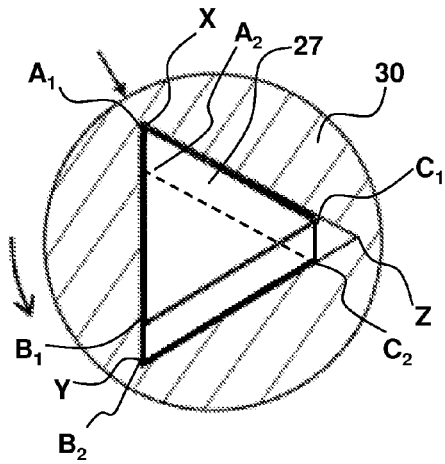
FIG. 5B is an end view showing the first embodiment of the rotatable drive connection illustrated in FIG. 5A after having been rotated approximately thirty degrees counterclockwise from the first rotational position.

Referring now to FIG. 5B, the end portion 27 and the input member 30 are rotated approximately 30 degrees from the initial position shown in FIG. 5A. In the illustrated position, the surface BC remains biased into contact with the surface YZ at the leading edge. However, the surface BC begins to slide along the surface YZ until the second edge portion $B_2$ engages the corner Y at the leading edge. The surface AB is now biased into contact with the surface XY at the leading edge. The first edge portion $A_1$ remains biased into engagement with the corner X at the tip, as described above. Engagement of the first edge portion $A_1$ with the corner X at the tip and the second edge portion $B_2$ with the corner Y at the leading edge can function to reduce lateral movement and torsional deflection of the end portion 27 within the aperture 32.

Figure 5C:
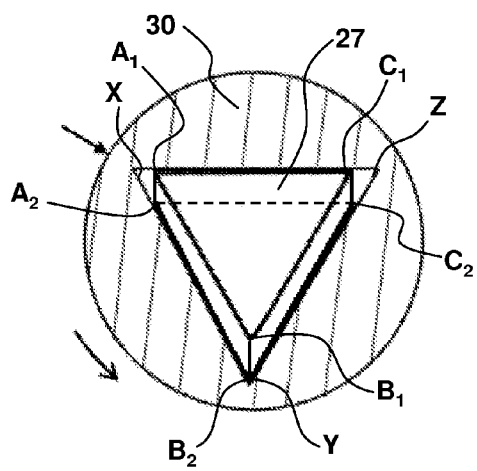
FIG. 5C is an end view showing the first embodiment of the rotatable drive connection illustrated in FIG. 5A after having been rotated approximately sixty degrees counterclockwise from the first rotational position.

Referring now to FIG. 5C, the end portion 27 and the input member 30 are rotated to approximately 60 degrees from the initial position shown in FIG. 5A. In the illustrated position, the second edge portion $B_2$ remains biased into engagement with the corner Y at the leading edge, as described above. The surface AC also remains biased into contact with the surface XZ at the tip. However, the surface AC begins to slide along the surface XZ such that the first edge portion $A_1$ is no longer engaged with the corner X at the tip. Nevertheless, engagement of the second edge portion $B_2$ with the corner Y can function to reduce lateral movement and torsional deflection of the end portion 27 within the aperture 32.

Figure 5D:
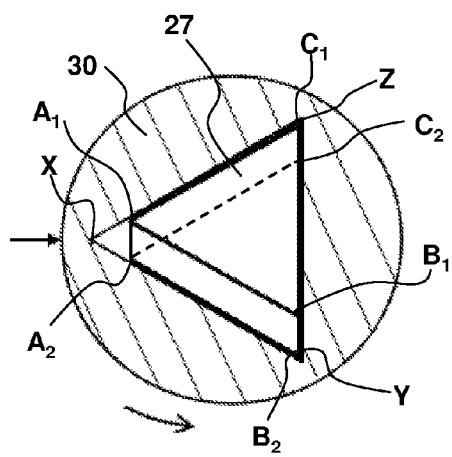
FIG. 5D is an end view showing the first embodiment of the rotatable drive connection illustrated in FIG. 5A after having been rotated approximately ninety degrees counterclockwise from the first rotational position.

Referring now to FIG. 5D, the end portion 27 and the input member 30 are rotated to approximately 90 degrees from the initial position shown in FIG. 5A. In the illustrated position, the second edge portion $B_2$ remains biased into engagement with the corner Y at the leading edge, as described above. The surface AC also remains biased into contact with the surface XZ but continues to slide along the surface XZ until the first edge portion $C_1$ engages the corner Z at the tip. The surface BC is now biased into contact with the surface YZ at the tip. Engagement of the second edge portion $B_2$ with the corner Y at the leading edge and the first edge portion $C_1$ with the corner Z at the tip can function to reduce lateral movement and torsional deflection of the end portion 27 within the aperture 32.

As the end portion 27 and the input member 30 continue to rotate, the sequence described above in FIGS. 5A through 5D is repeated any number of times. However, the next sequence begins with the surface AB biased into contact with the surface XY at the leading edge and the first edge portion $C_1$ biased into engagement with the corner Z at the tip.

Referring now to FIGS. 6 through 11, there are illustrated numerous embodiments of the flexible driveshaft 21 each having a differing end portion 27 in accordance with this invention. FIGS. 6 through 11 show cross-sectional end views of the end portion 27 taken along section line 6-6 of FIG. 2.

Thus, identical reference numerals will be used to identify similar elements, but will be differentiated by an ascending prefix number (ex. 121, 221, 321, etc.). It should be appreciated that the mating aperture (not shown) can define a cross-sectional shape that generally corresponds with the respective end portion or may define any other cross-sectional shape for a desired application.

Figure 6:
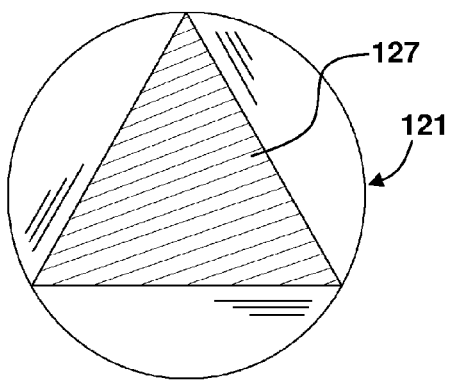
FIG. 6 is a sectional elevational view of the first embodiment of the end portion of the flexible driveshaft taken along line 6-6 of FIG. 2.

As shown in FIG. 6, a flexible driveshaft 121 is illustrated having an end portion 127. The illustrated end portion 127 is an equilateral triangle that defines three generally planar surfaces. The three surfaces are connected with one another, respectively, and intersect to form sharp edges.

Figure 7:
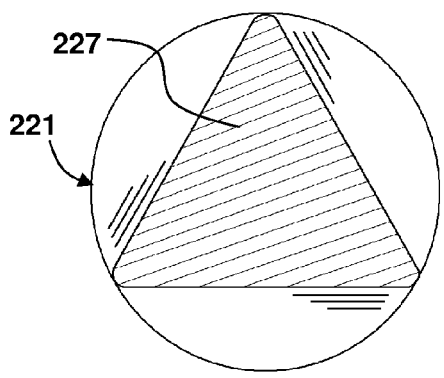
FIG. 7 is a sectional elevational view similar to FIG. 6 showing a second embodiment of the end portion of the flexible driveshaft in accordance with this invention.

As shown in FIG. 7, a flexible driveshaft 221 is illustrated having an end portion 227. The illustrated end portion 227 is also an equilateral triangle that defines three generally planar surfaces. However, in this embodiment the three surfaces are connected with one another, respectively, by rounded edges each having a radius. The rounded edges can have any suitable radius for a desired application.

Figure 8:
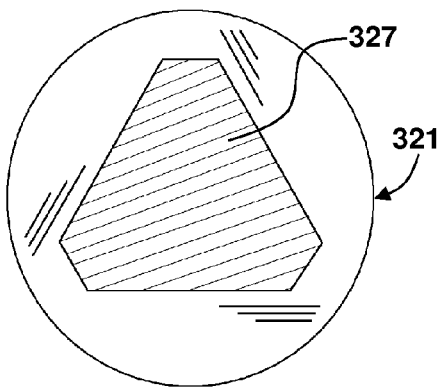
FIG. 8 is a sectional elevational view similar to FIG. 6 showing a third embodiment of the end portion of the flexible driveshaft in accordance with this invention.

As shown in FIG. 8, a flexible driveshaft 321 is illustrated having an end portion 327. The illustrated end portion 327 defines three generally planar surfaces. However, in this embodiment the three surfaces are connected with one another, respectively, by flat edges. This embodiment illustrates an end portion 327 having an even number of total edges (i.e. six), however, still functions in accordance with this invention.

Figure 9:
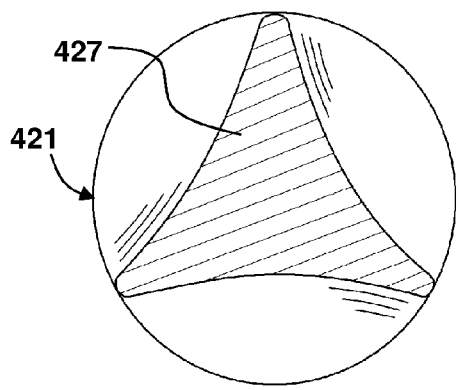
FIG. 9 is a sectional elevational view similar to FIG. 6 showing a fourth embodiment of the end portion of the flexible driveshaft in accordance with this invention.

As shown in FIG. 9, a flexible driveshaft 421 is illustrated having an end portion 427. The illustrated end portion 427 is also an equilateral triangle that defines three surfaces. However, the three surfaces each define a concave shape in cross section. It should be appreciated that this embodiment may incorporate any features as described above in FIGS. 6 through 8.

Figure 10:
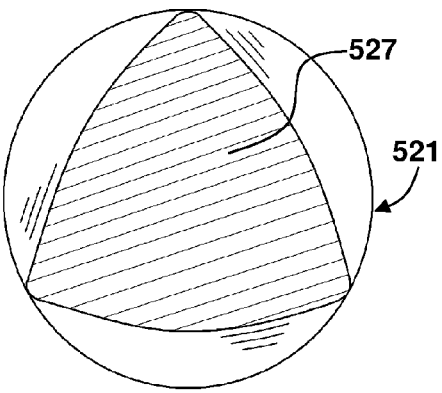
FIG. 10 is a sectional elevational view similar to FIG. 6 showing a fifth embodiment of the end portion of the flexible driveshaft in accordance with this invention.

As shown in FIG. 10, a flexible driveshaft 521 is illustrated having an end portion 527. The illustrated end portion 527 is also an equilateral triangle that defines three surfaces. However, the three surfaces each define a convex shape in cross section. It should also be appreciated that this embodiment may incorporate any features as described above in FIGS. 6 through 8.

Figure 11:
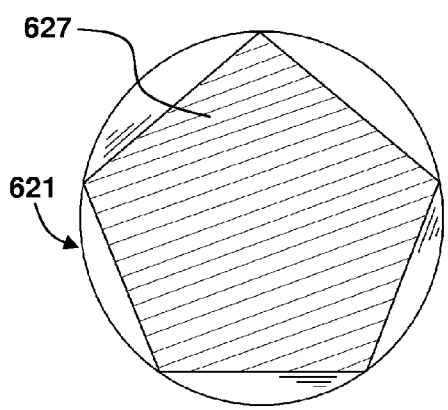
FIG. 11 is a sectional elevational view similar to FIG. 6 showing a sixth embodiment of the end portion of the flexible driveshaft in accordance with this invention.

As shown in FIG. 11, a flexible driveshaft 621 is illustrated having an end portion 627. The illustrated end portion 627 defines an equilateral pentagon that defines five generally planar surfaces. The five surfaces are connected with one another, respectively, to form sharp edges. However, it should be appreciated that the end portion 627 may incorporate any features as described above in FIGS. 6 through 10.

Accordingly, the end portions 27, 127, 227, 327, 427, 527, and 627 each define a cross-sectional shape having a plurality of axial edges that are respectively located opposite a surface. As described and illustrated above, at least one of the edges is biased into engagement with at least one of the corners throughout a full rotation of the mating components. More specifically, at least two outer surfaces of the end portion can be biased into contact with two inner surfaces of the aperture at either the leading edge or the tip, and at least a third outer surface of the end portion can be biased into contact with a third inner surface of the aperture at a location that is axially spaced from and generally opposite the two engaged surfaces. This arrangement can reduce lateral movement and torsional deflection of the end portions 27, 127, 227, 327, 427, 527, and 627 within the aperture. It should be appreciated that the end portion may include any number of edges or define any cross-sectional shape to accomplish the functions described herein.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A rotatable drive connection comprising:
   a first component including an aperture having a plurality of corners; and
   a second component including an end portion having a plurality of edges, the end portion of the second component being smaller than the aperture of the first component,
   wherein the end portion of the second component is disposed within the aperture of the first component such that at least one of the edges of the end portion is always biased into engagement with at least one of the corners of the aperture throughout a full rotation of the first and second components;
   wherein the end portion is biased into contact with a leading edge of the aperture and a tip of the end portion is biased into contact with an inner surface of the aperture at a location that is axially spaced from and generally opposite the leading edge; and
   wherein at least one of the edges is biased into engagement with at least one of the corners at either the leading edge or the tip, and at least one outer surface of the end portion is biased into contact with an inner surface of the aperture at a location that is axially spaced from and generally opposite the engaged edge and corner.

2. The rotatable drive connection of claim 1, wherein the end portion defines an odd number of edges and the aperture defines an odd number of corners.

3. The rotatable drive connection of claim 1, wherein the end portion defines a triangular cross section that extends in a linear fashion along an axial length of the end portion when in an unstressed position.

4. The rotatable drive connection of claim 1, wherein the end portion of the second component is disposed within the aperture of first component to form a loose fitting connection.

5. The rotatable drive connection of claim 1, wherein the first component is rotatable about a first axis of rotation and the second component is rotatable about a second axis of rotation.

6. A rotatable drive connection comprising:
   a first component including an aperture having a plurality of corners; and
   a second component including an end portion having a plurality of edges, the end portion of the second component being smaller than the aperture of the first component,
   wherein the end portion of the second component is disposed within the aperture of the first component such that at least one of the edges of the end portion is always biased into engagement with at least one of the corners of the aperture throughout a full rotation of the first and second components;
   wherein the end portion is biased into contact with a leading edge of the aperture and a tip of the end portion is biased into contact with an inner surface of the aperture at a location that is axially spaced from and generally opposite the leading edge; and
   wherein at least two outer surfaces of the end portion are biased into contact with two inner surfaces of the aperture at either the leading edge or the tip, and at least a third outer surface of the end portion is biased into contact with a third inner surface of the aperture at a location that is axially spaced from and generally opposite the two engaged surfaces.

7. A rotatable drive connection comprising:
a first component including an aperture having a plurality of corners; and
a second component including an end portion having a plurality of edges, the end portion of the second component being disposed within the aperture of the first component such that the end portion engages a leading edge of the aperture and a tip of the end portion engages an inner surface of the aperture at a location that is axially spaced from and generally opposite the leading edge,
wherein at least one of the edges of the end portion is always biased into engagement with at least one of the corners of the aperture throughout a full rotation of the first and second components, and
wherein at least two outer surfaces of the end portion are biased into contact with two inner surfaces of the aperture at either the leading edge or the tip, and at least a third outer surface of the end portion is biased into contact with a third inner surface of the aperture at a location that is axially spaced from and generally opposite the two engaged surfaces.

8. The rotatable drive connection of claim 7, wherein the end portion and the aperture each define an odd number of surfaces.

9. The rotatable drive connection of claim 7, wherein the end portion defines a triangular cross section that extends in a linear fashion along an axial length of the end portion when in an unstressed position.

10. The rotatable drive connection of claim 7, wherein the end portion of the second component is disposed within the aperture of first component to form a loose fitting connection.

11. The rotatable drive connection of claim 7, wherein the first component is rotatable about a first axis of rotation and the second component is rotatable about a second axis of rotation.

12. A seat assembly comprising:
a seat frame;
a drive mechanism;
an adjustment mechanism that is responsive to actuation of the drive mechanism for causing movement of the seat frame, wherein at least one of the drive mechanism and the adjustment mechanism includes a rotatable component having an aperture that defines a plurality of corners; and
a flexible driveshaft interconnected between the drive mechanism and the adjustment mechanism, the flexible driveshaft including at least one end portion defining a plurality of edges;
wherein the end portion is smaller than the aperture and is received within the aperture such that at least one of the edges of the end portion is always biased into engagement with at least one of the corners of the aperture throughout a full rotation of the rotatable component, and
wherein at least one of the edges is biased into engagement with at least one of the corners at either the leading edge or the tip, and at least one outer surface of the end portion is biased into contact with an inner surface of the aperture at a location that is axially spaced from and generally opposite the engaged edge and corner.

13. The seat assembly of claim 12, wherein the end portion defines an odd number of edges and the aperture defines an odd number of corners.

14. The seat assembly of claim 12, wherein the end portion defines a triangular cross section that extends in a linear fashion along an axial length of the end portion when in an unstressed position.

15. The seat assembly of claim 12, wherein the component having an aperture is rotatable about a first axis of rotation and the end portion of the flexible driveshaft is rotatable about a second axis of rotation.

16. The seat assembly of claim 12, wherein at least two outer surfaces of the end portion are biased into contact with two inner surfaces of the aperture at either the leading edge or the tip, and at least a third outer surface of the end portion is biased into contact with a third inner surface of the aperture at a location that is axially spaced from and generally opposite the two engaged surfaces.

* * * * *